United States Patent [19]

Clenet

[11] Patent Number: 5,800,003
[45] Date of Patent: Sep. 1, 1998

[54] VEHICLE BODY CONSTRUCTION

[75] Inventor: Alain J-M Clenet, Santa Barbara, Calif.

[73] Assignee: ASHA Corporation, Santa Barbara, Calif.

[21] Appl. No.: 778,247

[22] Filed: Jan. 8, 1997

[51] Int. Cl.[6] ............................. B62D 27/00; B60J 7/00
[52] U.S. Cl. ............................. 296/29; 296/205; 296/191
[58] Field of Search ........................... 296/191, 29, 205

[56] References Cited

U.S. PATENT DOCUMENTS

| | | |
|---|---|---|
| 2,389,907 | 11/1945 | Helmuth . |
| 3,292,969 | 12/1966 | Eggerts, Jr. . |
| 3,334,007 | 8/1967 | Flagan ..................... 296/29 X |
| 3,363,934 | 1/1968 | Peters . |
| 3,637,252 | 1/1972 | Metsker . |
| 3,944,008 | 3/1976 | Moore . |
| 4,045,075 | 8/1977 | Pulver . |
| 4,355,844 | 10/1982 | Muzzarelli . |
| 4,440,434 | 4/1984 | Celli . |
| 4,453,763 | 6/1984 | Richards . |
| 4,618,163 | 10/1986 | Hasler et al. . |
| 4,660,345 | 4/1987 | Browning . |
| 4,798,400 | 1/1989 | Kosuge . |
| 4,799,708 | 1/1989 | Handa et al. . |
| 5,094,313 | 3/1992 | Mauws . |
| 5,209,514 | 5/1993 | Janotik ..................... 296/29 |
| 5,213,386 | 5/1993 | Janotik et al. . |
| 5,320,403 | 6/1994 | Kazyak . |
| 5,332,281 | 7/1994 | Janotik et al. . |
| 5,338,080 | 8/1994 | Janotik et al. . |
| 5,362,120 | 11/1994 | Cornille, Jr. ..................... 296/29 X |

*Primary Examiner*—Joseph D. Pape
*Attorney, Agent, or Firm*—Brooks & Kushman P.C.

[57] ABSTRACT

A vehicle body construction (10) includes a tubular metallic space frame (11) to which panels are secured by adhesive connections (126) of elongated shapes. Each adhesive connection (126) includes elastomeric spacers (128) having a nominal thickness between the associated panel and tubular member in the range of 2 to 6 millimeters, and each adhesive connection also includes an adhesive (130) that extends between the associated panel and the tubular member intermediate the spacers and has a Shore A scale hardness in the range of 40 to 60.

10 Claims, 7 Drawing Sheets

VEHICLE BODY CONSTRUCTION

TECHNICAL FIELD

This invention relates to a vehicle body construction including a tubular space frame and panels secured to the space frame.

BACKGROUND ART

Vehicle body constructions have previously included space frames made from tubular members, such as disclosed by U.S. Pat. Nos.: 2,389,907 Helmuth; 3,292,969 Eggert, Jr.; 3,363,934 Peters; 3,637,252 Metsker; 3,944,008 Moore; 4,045,075 Pulver; 4,355,844 Fantini Muzzarelli; 4,440,434 Celli; 4,453,763 Richards; 4,618,163 Hasler et al; 4,660,345 Browning; 4,798,400 Kosuge; 4,799,708 Handa et al; 5,094,313 Mauws; 5,213,386 Janotik et al; 5,320,403 Kazyak; 5,332,281 Janotik et al; and 5,338,080 Janotik et al.

Welding is the conventional way to secure the tubular members to each other in vehicle body space frames such as disclosed by the above mentioned patents. When such welding involves securing the terminal end of one tubular member to an intermediate portion of another tubular member in a transversely extending relationship, the tubes must be relatively thick in order to be able to withstand thermal weld stresses and stresses that result from concentrated loading of the tubular members adjacent the weld. Furthermore, in certain developing areas of the world, electrical power is not always available to permit welding.

As exemplified by the above patents, vehicle body constructions conventionally utilize mechanical fasteners to secure panels to tubular members of a space frame in order to enclose the space frame to the general shape of the vehicle body construction. Since such mechanical fasteners cannot carry significantly load, diagonal braces are often utilized in order to reinforce connected tubular members that extend transversely to each other. Such diagonal braces add to the cost and resultant weight of the vehicle.

DISCLOSURE OF INVENTION

An object of the present invention is to provide an improved vehicle body construction including a tubular space frame and panels secured to the space frame.

In carrying out the above object, a vehicle body construction according to the present invention includes a space frame having metallic tubular members secured to each other to define the general shape of the vehicle body. A plurality of panels of the vehicle body construction enclose the space frame. Adhesive connections of elongated shapes secure the panels to the tubular members of the space frame and function as the sole securement of the panels to the space frame. Each adhesive connection includes elastomeric spacers interposed between the panels and the tubular members. The spacers are located in a spaced relationship from each other along the elongated adhesive connections. Each spacer has a nominal thickness between the associated panel and tubular member in the range of 2–6 millimeters. Each adhesive connection also includes an adhesive that extends between the associated panel and tubular member intermediate the spacers, and the adhesive of each connection has a Shore A scale hardness in the range of 40 to 60.

In the preferred embodiment, the spacers of each adhesive connection are made of urethane. Each spacer preferably includes an adhesive surface that is most preferably secured to the associated tubular member prior to the securement of the associated panel thereto by the adhesive. The urethane adhesive utilized after curing preferably has an elongation greater than 400% prior to fracture.

Preferably, the vehicle body construction has its metallic tubular members provided with round cross-sections. These round tubular members are most preferably made from stainless steel.

In the preferred embodiments disclosed, the vehicle body construction has the panels made as aluminum panels, fiberglass panels, resin transferred molded panels, blow molded resin panels each of which has inner and outer panel portions, and glass panels.

The objects, features and advantages of the present invention are readily apparent from the following detailed description of the best modes for carrying out the invention when taken in connection with the accompanying drawings.

BEST MODES FOR CARRYING OUT THE INVENTION

Figure 1:
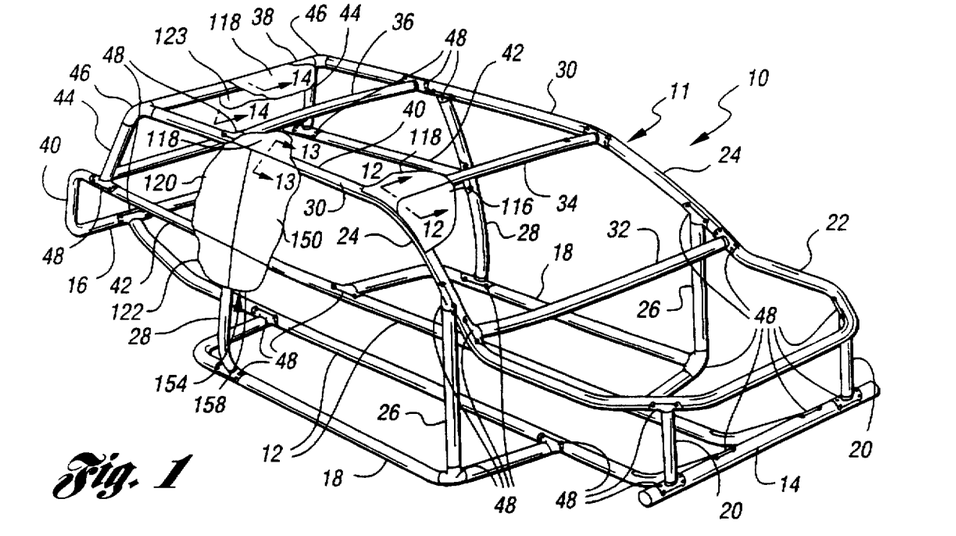
FIG. 1 is a perspective view of a vehicle body construction including a tubular space frame and panels secured thereto in accordance with the present invention.

With reference to FIG. 1 of the drawings, a vehicle body construction according to this invention is generally indicated by 10 and includes a space frame 11 made from metallic tubular members that are preferably stainless steel as is hereinafter more fully described. The vehicle body construction also includes panels secured to the space frame 11 by adhesive connections. However, before discussing the panels and the adhesive connections, the space frame 11 will be more fully described.

Space frame 11 as shown in FIG. 1 includes a pair of longitudinally extending lower members 12 whose front and rear ends are respectively connected to laterally extending front and rear tubular members 14 and 16. Inwardly opening U-shaped tubular members 18 are connected to intermediate portions of the longitudinally extending lower tubular members 12 at forward and rearward locations. Vertical tubular members 20 project upwardly from opposite ends of the front tubular member 14 and support an upper front tubular member of a rearwardly opening U-shaped tubular member 22 whose rear ends are respectively connected to lower ends of windshield side pillar tubular members 24. Front and rear vertical tubular members 26 and 28 respectively extend upwardly from the U-shaped tubular members 18 at forward and rearward locations and function as side door front and rear pillars. The front vertical tubular members 26 support the windshield side pillar tubular members 24 whose rear ends are connected to roof rail tubular members 30 that extend rearwardly and are supported by the rear vertical tubular members 28. Laterally extending tubular members 32 and 34 respectively connect the upper and lower ends of the windshield side pillar tubular members 24 while intermediate and rear laterally extending tubular members 36 and 38 connect the roof rail tubular members 30. The rear tubular member 16 has opposite sides 40 that extend upwardly and also has forwardly projecting ends 42 that are connected to the rear vertical tubular members 28. Inclined rear window pillar tubular members 44 extend upwardly from the forwardly projecting tubular member portions 42 and support three-legged connection members 46 which in turn support the rear ends of the roof rail tubular members 30 and the opposite lateral ends of the rear tubular member 38.

The vehicle body space frame 11 of the invention as illustrated in FIG. 1 also includes a plurality of metallic connectors 48 that secure terminal ends of certain tubular members to intermediate portions of other tubular members in a transversely extending relationship as is hereinafter more fully described. All of the tubular members described above as well as these connectors are made of stainless steel such that no rustproof processing is required.

Figure 2:
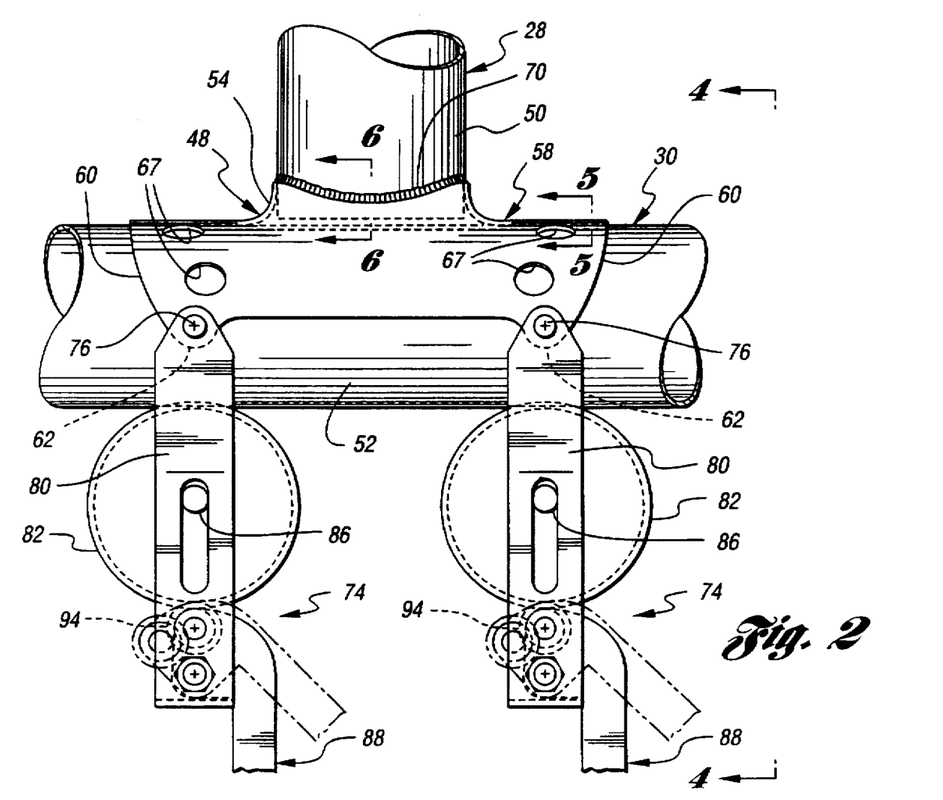
FIG. 2 is a partial side view illustrating the manner in which the terminal end of a first tubular member is secured to an intermediate portion of a second tubular member in a transversely extending relationship by a connector that is clamped in position by clamps to permit securement by a filler alloy.

With reference to FIG. 2, one of the rear tubular members 28 and its associated roof rail tubular member 30 are illustrated with the associated connector 48. Specifically, the tubular member 28 has a terminal end 50 located adjacent the connector 48. Tubular member 30 has an intermediate portion 52 located adjacent the connector 48 and the terminal end 50 of the tubular member 28 in a transversely extending relationship which is illustrated as perpendicular. However, it should be noted that the transversely extending relationships between the connected tubular members can also be skewed such as illustrated by the connection in FIG. 1 of the upper end of each front vertical tubular member 26 and the associated windshield pillar tubular member 24.

Figures 3, 4, 5, 6:
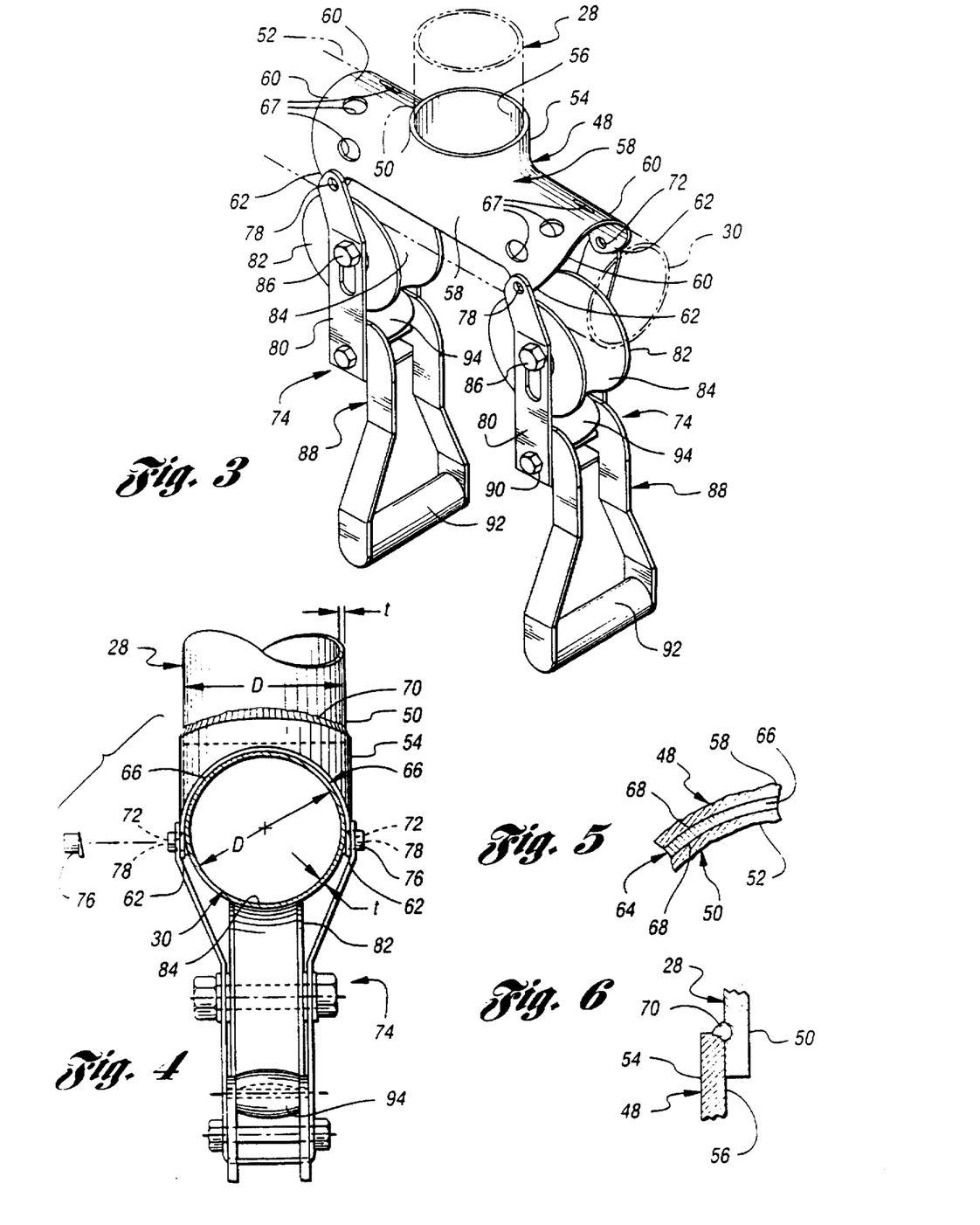
FIG. 3 is a perspective view that further illustrates the manner in which the connector secures the first and second tubular members to each other.
FIG. 4 is an end view taken along the direction of line 4—4 in FIG. 2 to further illustrate the manner in which the first and second tubular members are secured to each other by the connector.
FIG. 5 is a partial sectional view taken along the direction of line 5—5 in FIG. 2 to illustrate the manner in which a filler alloy secures a saddle portion of the connector to the second tubular member.
FIG. 6 is a partial sectional view taken along the direction of line 6—6 in FIG. 2 to illustrate the manner in which a weld secures an end connection portion of the connector to a terminal end of the first tubular member.

With continuing reference to FIG. 2 and also to FIGS. 3 and 4, the connector 48 is formed from sheet stainless steel by a stamping process and includes an end connection portion 54 having an opening 56 that receives the terminal end 50 of the tubular member 28 in a secured relationship. The connector 48 also includes a saddle portion 58 that extends from the end connection portion 54 and receives the intermediate portion 52 of the tubular member 30. This saddle portion 58 has opposite ends 60 each of which includes a pair of spaced clamp attachers 62 for use in clamping the saddle portion against the intermediate portion 52 of tubular member 30 for assembly as is hereinafter more fully described. A connection 64 (FIGS. 4 and 5) includes a filler alloy 66 that secures the saddle portion 58 to the intermediate portion 52 of tubular member 30.

The construction of the connector 48 in association with the tubular members 28 and 30 as described above permits a connection therebetween while utilizing relatively thin wall tubular members such that the resulting space frame is lightweight while still having the requisite strength. More specifically, the tubular members 28 and 30 each have a wall thickness t and a maximum cross-sectional dimension D that is at least 40 times the associated wall thickness t. More specifically, in the preferred construction illustrated, the first and second tubular members each have a round cross section with the wall thickness t and a diameter D that is at least 40 times the wall thickness t. For example, stainless steel tubular members with nominal diameters of about 6.35 cm and 7.62 cm can have respective wall thicknesses of 1.1 mm and 1.5 mm such that their maximum dimensions provided by the associated diameters D are respectively 58 and 51 times their wall thicknesses whereas conventional tubular members would have to have wall thicknesses for the same nominal diameters of about 2.2 and 3.0 mm such that their maximum cross-sectional dimensions provided by the associated diameter are only respectively about 29 and 25 times their associated wall thicknesses. The thinner walls that can be achieved through the use of the connectors 48 in addition to providing weight savings also results in use of less material such that, even with the more cost per pound of stainless steel, the space frame still is economical.

As best illustrated in FIGS. 2 and 3, the ends 60 of the connector saddle portion 58 each include a plurality of openings 67 through which the filler alloy can be observed to ensure that there is sufficient filler alloy to secure the connection between the saddle portion and the intermediate portion 52 of the tubular member 30. These openings 67 thus prevent a filler alloy starved connection that would be weak and possibly fail.

With reference to FIG. 5, the filler alloy 66 of the connection 64 is preferably a brazing material with a relatively high temperature melting point as opposed to a solder with a lower temperature melting point. This brazing material providing the filler alloy 66 forms an intermetallic alloy 68 with both the saddle portion 58 of the connector 48 and the intermediate portion 52 of the tubular member 50.

With reference to FIG. 6, the connector 48 includes a weld 70 that fuses the end connection portion 54 of connector 48 and the terminal end 50 of the tubular member 28. This weld can be made at a main factory site prior to shipment of components of the space frame to a remote assembly location where there is no electrical power for performing welding but where the saddle connection described above can be made by a filler alloy that as mentioned above is preferably a brazing material.

With reference to FIGS. 2, 3 and 4, the clamp attacher 62 of the saddle portion 58 are illustrated as being embodied by projections that extend away from the end connection portion 54 of the connector and preferably include holes 72 for securing an associated clamp 74 that secures the adjacent end 60 for the assembly. As illustrated in FIGS. 3 and 4, a headed clamp attachment pin 76 has its shank projecting outwardly through each hole 72 of the connector clamp attacher projection and is also received by an associated hole 78 of a clamp yoke 80 whose construction is best illustrated in FIG. 3. The yoke 80 of each clamp receives an associated round clamp member 82 whose round surface 84 is shaped to engage the associated intermediate portion 52 of tube member 30 for a clamping operation. A pin and slot connection 86 between the yoke 80 and the clamp member 82 allows movement of the clamp member under the control of a clamp actuator 88. More specifically, the clamp actuator 88 has a pivotal connection 90 to the closed end of the yoke 80 and has a handle 92 for pivoting thereof to move a clamp actuator member 94. The clamp actuator member 94 has an outer surface 96 complimentary to the clamp member surface 84 so as to facilitate movement thereof for clamping.

With reference to FIG. 2, clockwise rotation of the clamp actuator 88 about connection 90 from the phantom line position to the solid line position moves the actuator member 94 to force the clamp member 82 upwardly which in turn pulls the saddle portion 58 of the connector 48 downwardly into clamped engagement with the intermediate portion 52 of tubular member 30. The relatively close engagement of these members facilitates securement thereof by a filler alloy upon heating and specifically through the use of a brazing material so as to provide a relatively high strength connection as previously described.

Any suitable type of brazing material can be utilized such as a silver brazing material and the requisite heat can be applied through a gas torch, heating of the tubular member 30 and the connector 48 prior to the connection as well as heating of the clamp so that heat therefrom flows to the connector and the tube member 30 upon clamping. The brazing provided by the assembly provides a high strength connection without deforming the stainless steel tubular member 30 and the stainless steel connector 48 as well as the stainless steel tubular member 28 secured to the end connection 54.

Figure 7:
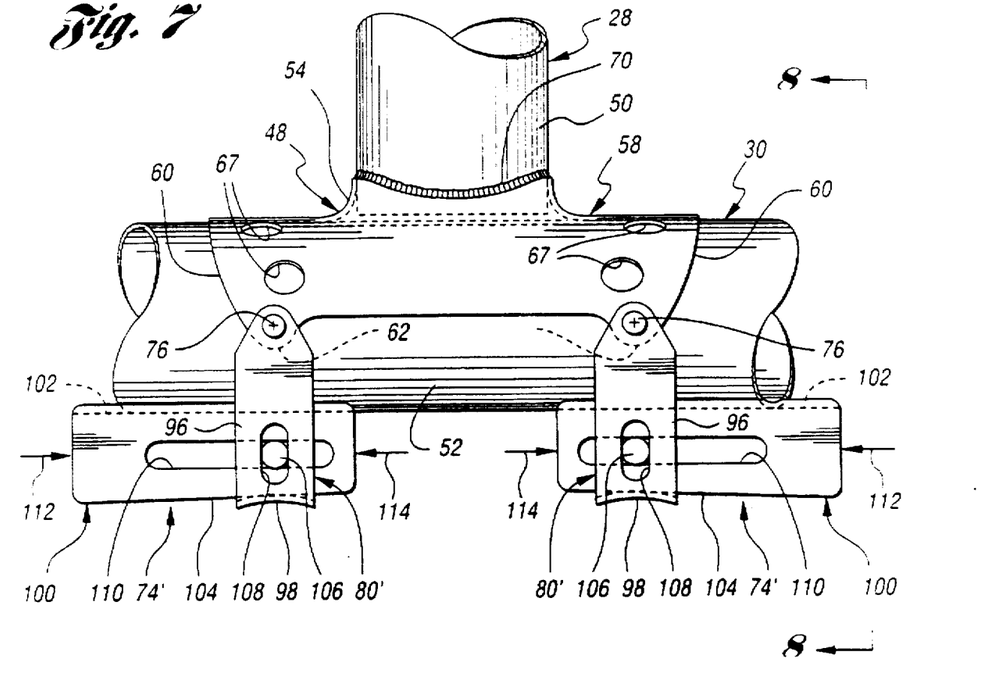
FIG. 7 is a view similar to FIG. 2 but illustrating an alternative construction of the clamps.
Figure 8:
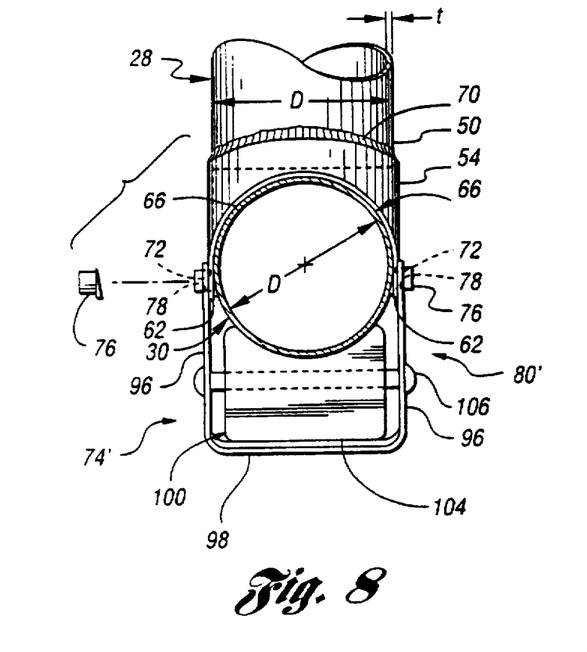
FIG. 8 is an end view taken along the direction of line 8—8 in FIG. 7 to further illustrate the alternative construction of the clamps.

With reference to FIGS. 7 and 8, an alternative embodiment of the clamps 74' each has its yoke 80' constructed to include a pair of spaced vertical legs 96 whose upper ends have holes that receive the associated attachment pins 76 and whose lower ends are connected by a web 98 of the clamp yoke. This yoke web 98 has a curved cross section as shown in FIG. 7. A wedge actuator 100 of each clamp 74' has an upper curved surface 102 (FIG. 8) that engages the intermediate portion 52 of the tube member 30. A lower curved surface 104 of each wedge actuator 100 engages the curved yoke web 98 and is angled with respect to the elongated length of the upper surface 102 so as to provide the wedge construction. A pin 106 extends through a vertical slot 108 in each yoke leg 96 and through a horizontal slot 110 in the wedge actuator 100 between its upper surface 102 and its lower surface 104. A force applied to the wedge actuator 100 in the direction indicated by each arrow 112, such as by a mallet or other suitable tool, pulls the saddle portion 58 of the connector 48 against the intermediate portion 52 of tube member 30 in order to permit the securement by the filler alloy as previously described. Thereafter, the clamps 74' can be removed by application of a force in the direction indicated by arrows 114 to thus permit removal of the clamps from the connected tube members.

With reference to FIG. 1, the vehicle body construction 10 includes a plurality of panels for enclosing the space frame 11. These panels are specifically disclosed as including a glass windshield panel 116, a fiberglass roof panel 118, a glass rear quarter window panel 120, a rear quarter fiberglass panel 122, a rear window 123 and other unillustrated panels such as exemplified by the panel 124 shown in FIG. 9.

Figure 9:
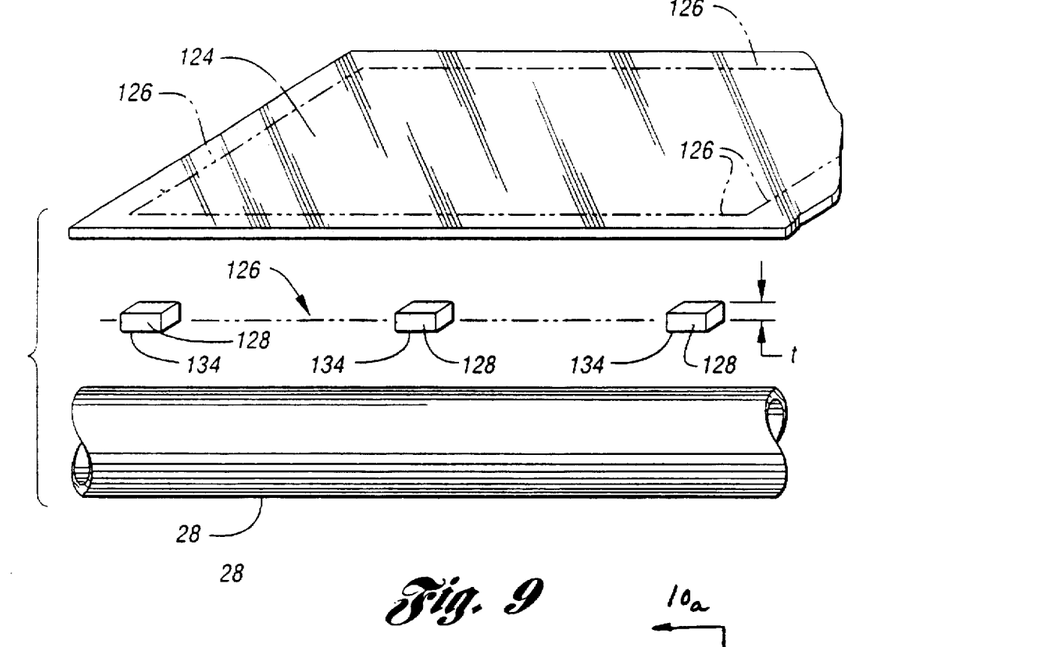
FIG. 9 is an exploded perspective view that illustrates one tubular member of the space frame and an associated panel whose illustrated extremities are secured thereto by adhesive connections of an elongated shape including spacers that are illustrated.

With reference to FIG. 9, the panel 124 that cooperates with the other panels to enclose the space frame of the vehicle body construction is also illustrated as being associated with adhesive connections 126 of elongated shapes illustrated schematically. These adhesive connections secure the panel 124 to the tubular members of the space frame such as the one tubular member 28 illustrated and as previously described in connection with the saddle type connector 48. The adhesive connections 126 function as the sole securement between the panels and the spacer frame such that there is no necessity for the more conventional mechanical fasteners that have previously been utilized.

Each adhesive connection 126 as illustrated in FIG. 9 includes elastomeric spacers 128 interposed between the associated panel and tubular members. The spacers 128 are located in a spaced relationship to each other along the elongated adhesive connections 126 and each spacer has a nominal thickness between the associated panel and the tubular member in the range of 2–6 millimeters in an unstressed condition.

Figure 10:
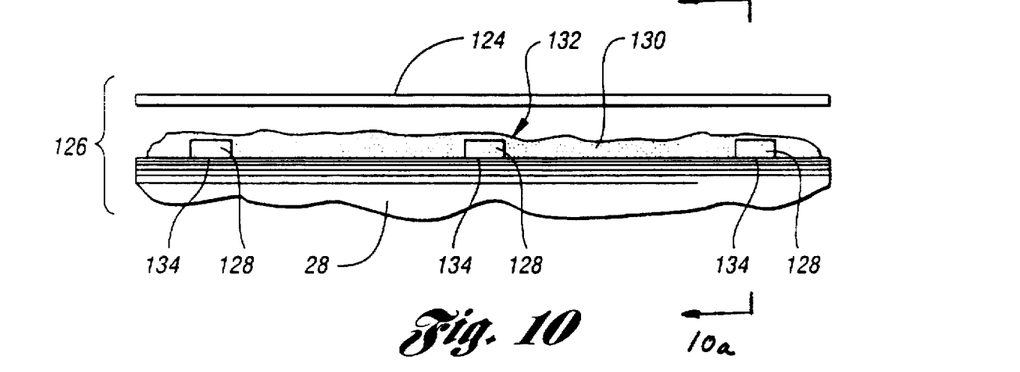
FIG. 10 is an exploded perspective view showing the tubular member and the panel after an adhesive has been applied between the spacers interposed between the tubular member and the panel.
Figure 10A:
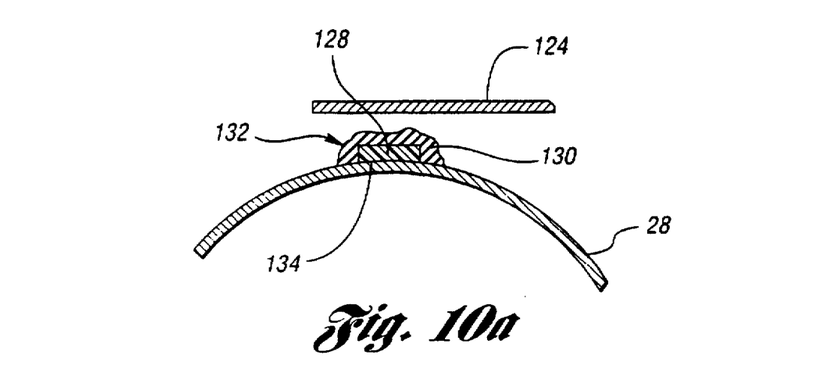
FIG. 10a is a sectional view taken along the direction of line 10a—10a in FIG. 10 to further illustrate the tubular member, the panel and the adhesive before the assembly.
Figure 11:
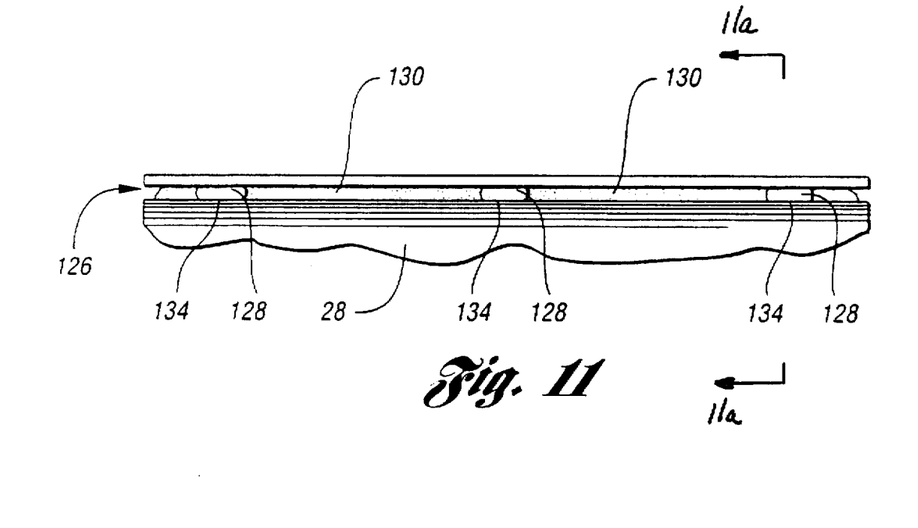
FIG. 11 is a view illustrating the panel secured to the tubular member by the adhesive connection to thus secure the panel to the space frame.
Figure 11A:
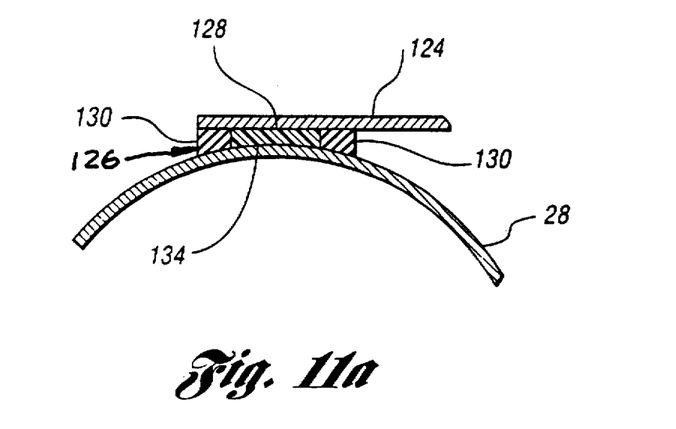
FIG. 11a is a sectional view taken along the direction of line 11a—11a in FIG. 11 to further illustrate the completed adhesive connection.

As illustrated in FIGS. 10 and 10a, each adhesive connection 126 also includes an adhesive 130 that is initially applied as a bead 132 with a greater thickness than the spacers 128. During assembly, the panel 124 is moved toward the associated tubular member 28 into engagement with the adhesive bead 132 to provide flattening thereof prior to engagement with the spacers 128 as shown in FIGS. 11 and 11a. The spacers 128 thus ensure that the adhesive connection 126 is not starved of the adhesive 130 and also provide a sufficient thickness of adhesive to permit a certain amount of flexing as the vehicle body construction is stressed during use. Nevertheless, the spacers 28 are not too thick such that the adhesive connections 126 are so thick that there is too much adhesive so that the panels cannot provide structural support to the tubular members. The support provided to the tubular members by the panels through the adhesive connections permits elimination of more conventional diagonal braces between adjacent transverse tubular members. The degree to which flexing of the space frame is permitted by the panels secured by the adhesive connections 126 depends primarily upon the thickness of the adhesive connections and the hardness of the adhesive which has a Shore hardness on the A scale of 40 to 60.

In the preferred embodiment of the vehicle body construction, the spacers 128 as illustrated in FIGS. 9–11 are made of urethane and each spacer includes an adhesive surface 134. The adhesive surfaces 134 of the spacers 128 are preferably secured to the associated tubular member 28 prior to securement of the associated panel 124 thereto by the adhesive. Such securement of the spacers 128 to the tubular members 28 is preferable to securing the spacers to the panels prior to the assembly since easier positioning of the panels in the proper location to the space frame is possible.

As previously mentioned in connection with the description of the space frame 11 and as is hereinafter more fully apparent from the following description of FIGS. 12–16, the metallic tubular members of the space frame preferably have round cross-sections and are most preferably made from stainless steel so as to eliminate the necessity of rustproofing the space frame.

The panels of the vehicle body construction 10 can have different constructions as is hereinafter more fully described in connection with FIGS. 12–16.

Figure 12:
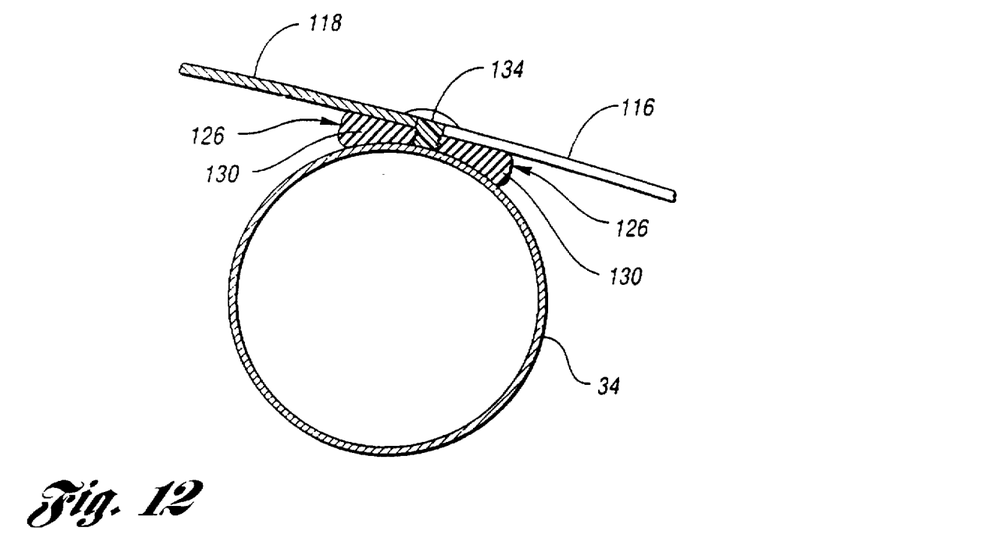
FIG. 12 is a partial sectional view taken along the direction of line 12—12 in FIG. 1 to illustrate the manner in which a glass windshield panel and a fiberglass roof panel are secured by associated adhesive connections to a metallic tubular member that embodies a windshield header of the space frame.

As illustrated in FIG. 12, the laterally extending metallic tubular member 34 that provides the windshield header 34 is illustrated as having adhesive connections 126 for securing the glass windshield panel 116 and a fiberglass roof panel 118. A trim strip 135 of any suitable construction covers the junction between the windshield panel 116 and the roof panel 118.

Figure 13:
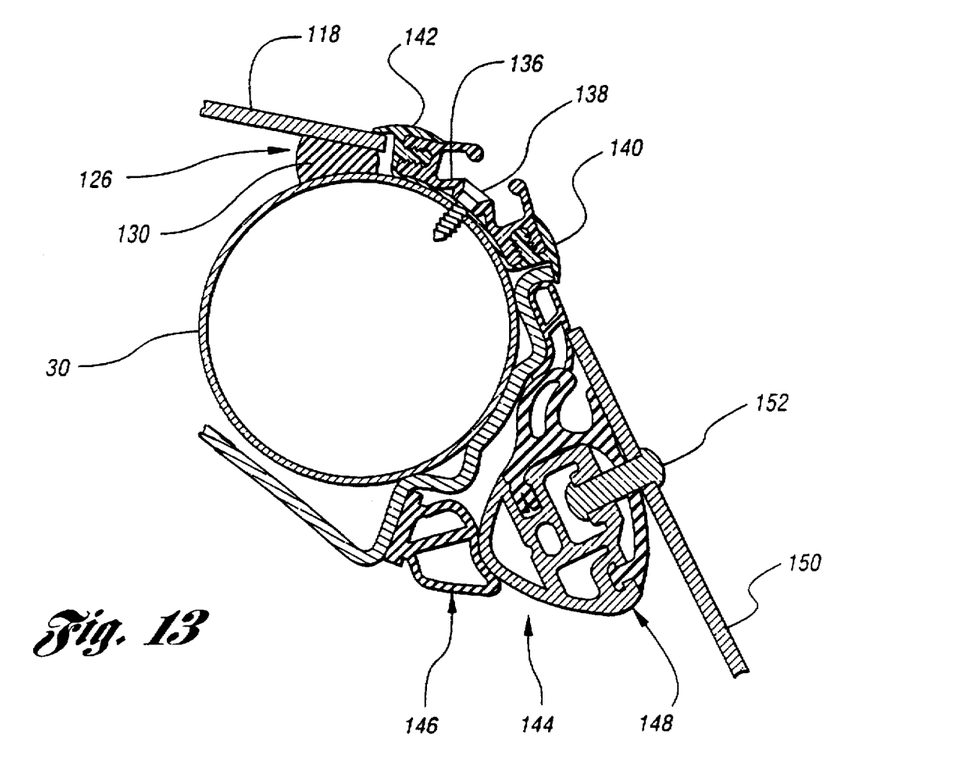
FIG. 13 is a partial sectional view taken along the direction of line 13—13 in FIG. 1 to illustrate the manner in which an adhesive connection secures the fiberglass roof panel to a metallic tubular member that functions as a roof rail that also cooperates with associated side door window seals.

With reference to FIG. 13, the roof rail metallic tubular member 30 is also illustrated as having the fiberglass roof panel 118 secured to its upper side by an elongated adhesive connection 126 as previously described in association with a trim holder 136 secured by a mechanism fastener screw 138 and supports a trim piece having edges 140 and 142. One of the trim piece edges 140 covers an adjacent extremity of a seal assembly 144 which includes a roof rail mounted seal 146 and a door window seal 148 mounted on the adjacent side door window 150 by a plurality of mechanical through hole fasteners 152, only one of which is shown in this view. The other trim piece edge 142 covers the adjacent edge of the fiberglass roof panel 118. These trim piece edges are not structural components and play no part in securing the associated panels to the tubular member. More specifically, the trim piece edges are made of plastic and are incapable of providing any load securing function like that provided by the adhesive connections 126.

With reference to FIG. 1, the rear vertical metallic tubular member 28 that provides the side door rear pillar has one of the elongated adhesive connections for securing the front edge of the rear quarter glass panel 120 at the rear side of the side door window 150. At the same location there is another seal assembly with a body mounted seal mounted on the tubular member 28 and with a side door window seal mounted on the side door window 150 in the same manner previously described in connection with FIG. 13.

With reference to FIG. 1, the rear vertical metallic tubular member 28 that provides the rear side door pillar has one of the adhesive connections for securing the fiberglass rear quarter panel 122. In addition, the side door 154 has an inner panel and a fiberglass outer panel 158 that are secured by one of the adhesive connections and that cooperate to receive the lower extremity of the vehicle side door 150 below the vehicle belt line and which also receive the entirety of the vehicle side door window in its lowered position.

Figures 14, 15:
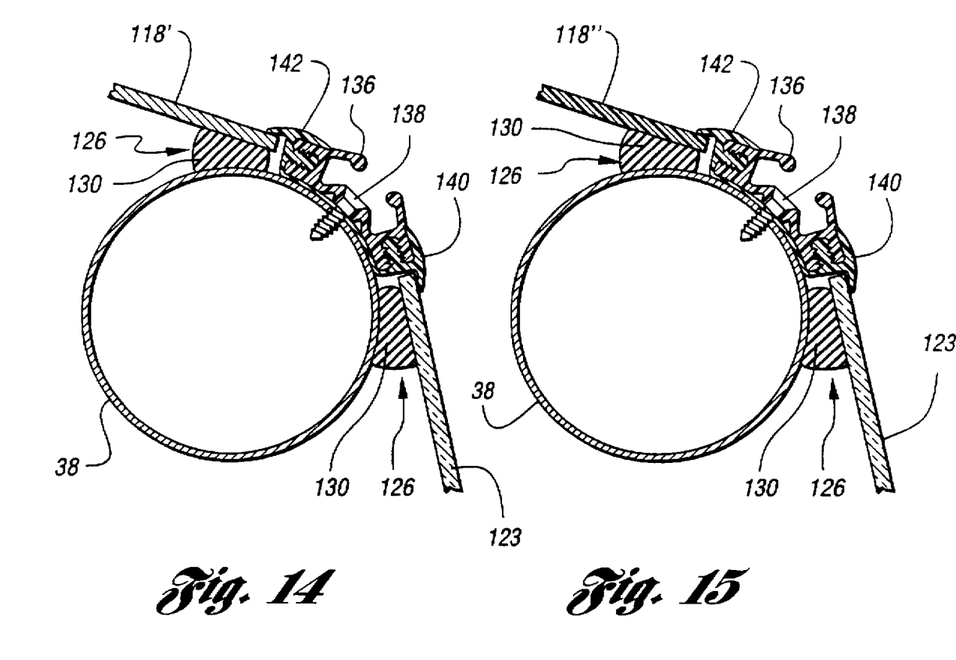
FIG. 14 is a sectional view taken along the direction of line 14—14 in FIG. 1 and illustrates the rear tubular member to which is secured an aluminum roof panel and a rear back window by associated adhesive connections.
FIG. 15 is a partial sectional view similar to FIG. 14 but illustrates the roof as being made as a resin transfer molded panel secured by the adhesive connection to the tubular member that embodies the windshield header.

With reference to FIG. 14, the rear tubular member 38 is illustrated as having the roof panel 118' made as an aluminum panel and secured thereto by an associated adhesive connection 126. In addition, the rear window 123 is also secured to the rear member 38 by an associated adhesive connection 126. A trim piece holder 136, a fastener screw 138, and trim piece edges 140 and 142 cooperate to cover the edges of the panels.

With reference to FIG. 15, a further embodiment similar to the embodiment of FIG. 14 is shown but with this embodiment having the roof panel 118" made by resin transfer molding so as to be a resin transfer molded panel.

Figure 16:
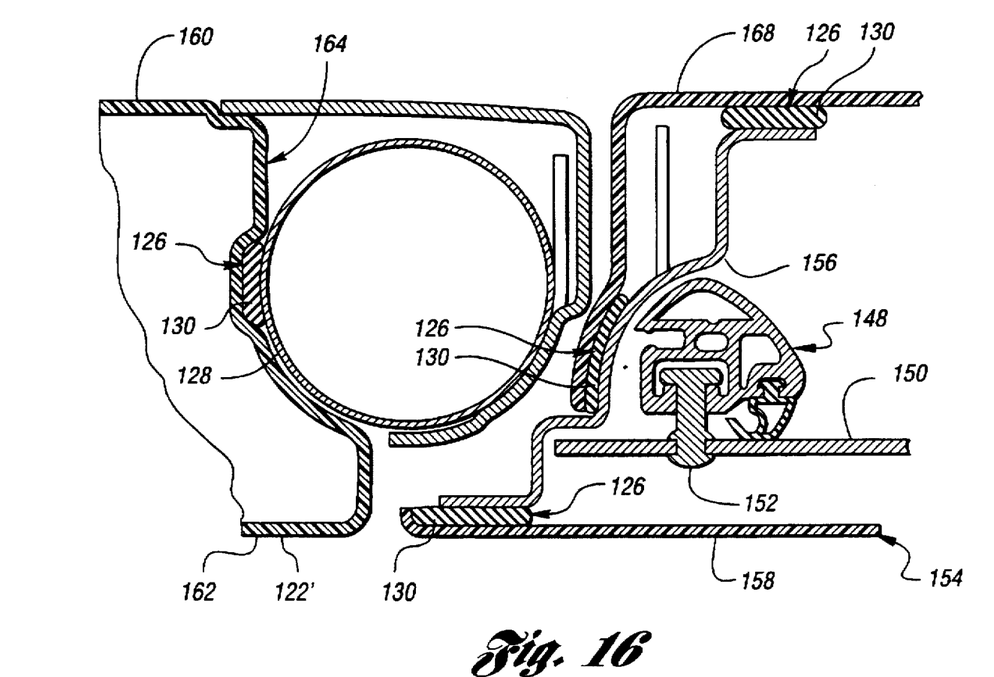
FIG. 16 is a partial sectional view a blow molded rear quarter panel secured to the side door rear pillar by the adhesive connection and having inner and outer panel portions.

With reference to FIG. 16, a further embodiment has the rear quarter panel 122' made by blow molding so as to include inner and outer panel portions 160 and 162. A connection panel 164 extends between the inner and outer panels and includes a connection portion 166 that receives the adhesive connection 126. Also, a support 128' on the tubular member 128 engages the blow molded rear panel 122' adjacent the junction of the inner panel 162 and the connection panel 164. This construction of the blow molded rear panel 122' can be forced into position by a snap action that holds the panel in position as the adhesive cures. Also, the door inner panel 156 is illustrated as having a plastic trim piece 168 secured thereto by a pair of the adhesive connections 126.

As is apparent from the above description and of FIGS. 12–16, the vehicle body construction can have the panels secured by the adhesive connection described constructed as aluminum panels, fiberglass panels, resin transfer molded panels, blow molded panels each of which has inner and outer panel portions, and glass panels.

While the best modes for carrying out the invention have been described in detail, those familiar with the art to which this invention relates will recognize various alternative designs and embodiments for carrying out the invention as described by the following claims.

What is claimed is:

1. A vehicle body construction comprising:
   a space frame including metallic tubular members secured to each other to define the shape of the vehicle body;
   a plurality of panels for enclosing the space frame; and
   adhesive connections of elongated shapes that secure the panels to the tubular members of the space frame and function as the sole securement therebetween, each adhesive connection including elastomeric spacers interposed between the panels and the tubular members, the spacers being located in a spaced relationship from each other along the elongated adhesive connections, each spacer having a nominal thickness between the associated panel and tubular member in the range of 2 to 6 millimeters, each adhesive connection also including an adhesive that extends between the associated panel and tubular member intermediate the spacers, and the adhesive of each connection having a Shore A scale hardness in the range of 40 to 60.

2. A vehicle body construction as in claim 1 wherein the spacers are made of urethane.

3. A vehicle body construction as in claim 1 or 2 wherein each spacer includes an adhesive surface.

4. A vehicle body construction as in claim 3 wherein the adhesive surface of each spacer is secured to the associated tubular member prior to the securement of the associated panel thereto by the adhesive.

5. A vehicle body construction as in claim 1 wherein the adhesive is a urethane adhesive that after curing has an elongation greater than 400% prior to fracture.

6. A vehicle body construction as in claim 1 wherein the metallic tubular members have round cross sections.

7. A vehicle body construction as in claim 6 wherein the round tubular members are made from stainless steel.

8. A vehicle body construction as in claim 1 wherein the panels are selected from the group consisting of aluminum panels, fiberglass panels, resin transfer molded panels, blow molded resin panels each of which has inner and outer panel portions, and glass panels.

9. A vehicle body construction comprising:

a space frame including stainless steel tubular members secured to each other to define the shape of the vehicle body;

a plurality of panels for enclosing the space frame; and adhesive connections of elongated shapes that secure the panels to the tubular members of the space frame and function as the sole securement therebetween, each adhesive connection including elastomeric spacers interposed between the panels and the tubular members, each spacer having an adhesive surface that provides securement thereof to the associated tubular member in a spaced relationship from the other spacers along the length of the adhesive connection, each spacer having a nominal thickness between the associated panel and tubular member in the range of 2 to 6 millimeters, each adhesive connection also including an adhesive that extends between the associated panel and tubular member intermediate the spacers, and the adhesive of each connection having a Shore A scale hardness in the range of 40 to 60.

10. A vehicle body construction comprising:

a space frame including stainless steel tubular members having round cross sections and being secured to each other to define the shape of the vehicle body;

a plurality of panels for enclosing the space frame; and adhesive connections of elongated shapes that secure the panels to the tubular members of the space frame and function as the sole securement therebetween, each adhesive connection including elastomeric spacers interposed between the panels and the tubular members, each spacer having an adhesive surface that provides securement thereof to the associated tubular member in a spaced relationship from the other spacers along the length of the adhesive connection, each spacer having a nominal thickness between the associated panel and tubular member in the range of 2 to 6 millimeters, each adhesive connection also including an adhesive that extends between the associated panel and tubular member intermediate the spacers, and the adhesive of each connection having a Shore A scale hardness in the range of 40 to 60.

* * * * *